US010038878B1

(12) United States Patent
Seo

(10) Patent No.: US 10,038,878 B1
(45) Date of Patent: Jul. 31, 2018

(54) VIDEO CONFERENCE METHOD USING CONFERENCE ROOM OBJECTS

(71) Applicant: RSUPPORT CO., LTD., Seoul (KR)

(72) Inventor: Hyungsu Seo, Gyeonggi-do (KR)

(73) Assignee: RSUPPORT CO., LTD., Seoul (KR)

( * ) Notice: Subject to any disclaimer, the term of this patent is extended or adjusted under 35 U.S.C. 154(b) by 0 days.

(21) Appl. No.: 15/789,112

(22) Filed: Oct. 20, 2017

(30) Foreign Application Priority Data

Mar. 24, 2017 (KR) .................. 10-2017-0037362

(51) Int. Cl.
*H04N 7/15* (2006.01)
*H04L 29/08* (2006.01)
*H04L 29/06* (2006.01)

(52) U.S. Cl.
CPC .......... *H04N 7/15* (2013.01); *H04L 65/1069* (2013.01); *H04L 65/403* (2013.01); *H04L 67/146* (2013.01)

(58) Field of Classification Search
CPC .......... H04N 7/15; H04N 7/142; H04N 7/157; H04N 21/4788; H04N 5/23206; H04N 21/482; H04N 21/6125; H04N 21/6377; H04N 21/6405; H04N 21/64322; H04N 21/658; H04N 21/858; H04N 5/4403; H04L 65/403
See application file for complete search history.

(56) References Cited

U.S. PATENT DOCUMENTS

| 8,471,890 | B1* | 6/2013 | Golas | H04N 7/15 348/14.08 |
| 2002/0169832 | A1* | 11/2002 | Lee | G06Q 10/10 709/205 |
| 2007/0279484 | A1* | 12/2007 | Derocher | H04N 7/15 348/14.09 |
| 2008/0266380 | A1* | 10/2008 | Gorzynski | H04N 7/15 348/14.08 |
| 2009/0040288 | A1* | 2/2009 | Larson | H04N 7/142 348/14.09 |
| 2011/0069141 | A1* | 3/2011 | Mitchell | H04L 12/1822 348/14.09 |
| 2012/0306992 | A1* | 12/2012 | Watson | H04N 7/147 348/14.07 |

(Continued)

FOREIGN PATENT DOCUMENTS

KR 10-2015-0022029 A 3/2015
KR 10-2016-0076801 A 7/2016

*Primary Examiner* — Mohammad Islam
(74) *Attorney, Agent, or Firm* — Mintz Levin Cohn Ferris Glovsky and Popeo, P.C.; Kongsik Kim

(57) ABSTRACT

The present invention relates to a video conference method using a computer 20 and a conference server 10 connected to the Internet, in which objects that can be selected by a user, such as icons, buttons and the like, are outputted on the computer 20 connected to the conference server 10, and the computer 20 is registered as a participant of a conference as the user performs handling of selecting an object, and thus circulation of video information is performed through the conference server 10. Through the present invention, it is possible to participate in a video conference only by intuitive handling of selecting an object implemented in a computer 20 without inputting the complicated identification information or a URL, and therefore, an effect of enhancing user's convenience and expanding utilization of an Internet video conference can be obtained.

3 Claims, 6 Drawing Sheets

(56) References Cited

U.S. PATENT DOCUMENTS

| | | | |
|---|---|---|---|
| 2013/0222526 A1* | 8/2013 | Miyazawa | H04N 7/155 348/14.08 |
| 2014/0156592 A1* | 6/2014 | Bank | G06F 17/30345 707/609 |
| 2014/0173701 A1* | 6/2014 | Albouyeh | H04L 63/08 726/4 |
| 2014/0298205 A1* | 10/2014 | Oike | H04L 65/403 715/753 |
| 2015/0281476 A1* | 10/2015 | Watanabe | H04N 1/38 348/207.1 |
| 2016/0134570 A1* | 5/2016 | Yin | H04L 51/046 709/204 |
| 2016/0156615 A1* | 6/2016 | Arai | H04L 63/083 726/4 |

* cited by examiner

VIDEO CONFERENCE METHOD USING CONFERENCE ROOM OBJECTS

CROSS-REFERENCE TO RELATED APPLICATIONS

This application claims priority to Korean Application No. 10-2017-0037362 filed on Mar. 24, 2017, which is incorporated herein by reference.

TECHNICAL FIELD

The present invention relates to a video conference method using a computer 20 and a conference server 10 connected to the Internet, in which objects that can be selected by a user, such as icons, buttons and the like, are outputted on the computer 20 connected to the conference server 10, and the computer 20 is registered as a participant of a conference as the user performs handling of selecting an object, and thus circulation of video information is performed through the conference server 10.

RELATED ART

Owing to improvement in Internet communication speed and performance of personal computers, a video conference among multiple parties through the Internet and the personal computers can be held without a leased communication line, expensive video and audio equipment and construction of a signal processing system, and Korean Patent Registration No. 1651353 is an example of a related conventional technique.

SUMMARY

Conventional Internet-based video conference services including Korean Patent Registration No. 1651353 are performed through computers mounted with a photographing function and connected to the Internet, together with a server which relays video information among the computers of conference participants. The video conference is progressed through a process of receiving video information transmitted from a user computer of one side participating in the video conference and transferring the video information to a user computer of another side by the server.

This is relaying circulation of the video information by the server between a computer of one side and a computer of another side while a session is established between the computer of one side and the server and a session is also established between the server and the computer of another side. When the server relays a plurality of conferences, the server requests information for specifying a participating conference when a session for circulating the video information is established between the server and computers participating in each conference in order to specify the computers participating in each conference and correctly transfer the video information among the participating computers.

That is, since the server which provides a video conference service through personal computers and the Internet should relay a plurality of conferences at the same time, the server should relay video information without confusion by correctly grasping computers participating in each of the conferences while a plurality of computers participating in a plurality of different conferences is connected to the hardware server. Accordingly, a computer participating in a video conference should notify the server of a conference in which the computer participates, and the server needs to receive the notification and clearly grasp the computers participating in the video conferences that the server relays.

A specific problem of a computer participating in a conference is a method of setting participant identification information for specifying a computer or a session participating in a conference, setting conference identification information for specifying a video conference, constructing a list recording both the conference identification information and the participant identification information, and inquiring the list by the server when video information is relayed, or a method of setting computers connected to the same server program as participants of a specific conference by separately executing a server program, to which a video conference program of a computer participating in the conference is connected as a client, for each individual conference.

The former is a method in which a single server circulates video information by utilizing information for identifying a conference and a participant while relaying a plurality of conferences at the same time, and the latter may be referred to as a method of constructing a plurality of servers in appearance and circulating video information of each conference by a separate server, in which a computer participating in the conference is connected, as a client, to a server program which relays the conference that the computer participates in. Both the former and latter methods have one thing in common that a computer participating in a conference should transmit identification information capable of specifying the conference or correctly connect to a server program which relays a specific conference.

That is, in a conventional Internet video conference, a user of a computer participating in a conference needs to input and transmit identification information, such as a character string or a numeric string that can specify a conference desired by the user to participate in, to a server or to input a URL (uniform resource locator) or the like of a server program which relays a conference desired by the user to participate in and connect the computer to the corresponding server program.

Accordingly, there is a problem in that a participant of a conventional Internet video conference may participate in the conference only when the participant correctly recognize identification information, a server program URL or the like assigned to a conference in which the participant is going to participate and has to endure the inconvenience of inputting complicated information even in the process itself of participating in the conference, and the process of participating in the conference is excessively difficult for a user who is inexperienced in using the Internet and a computer.

Particularly, since the conventional Internet video conference needs to propagate conference identification information, a server program URL or the like to all conference participants whenever a conference is held, there is a serious problem of frequently generating confusions and errors in the process of propagating the conference identification information, the server program URL or the like to the conference participants.

The present invention has been conceived in consideration of the problems described above, and there is provided a video conference method using a conference room object, the method being performed by a plurality of computers 20 and a conference server 10 connected through the Internet, and comprising: a connection step (step S11) of connecting to the conference server 10 through the Internet by a conference program of a computer 20 and transmitting information on the conference room object 30 to the corresponding conference program by the conference server 10; a registration step (step S12) of registering a corresponding computer 20 as a participant of a corresponding conference room object 30 by the conference server 10 if the conference room object 30 is selected by the conference program of the computer 20; an additional connection step (step S21) of connecting to the conference server 10 through the Internet by a conference program of another computer 20 and transmitting information on the conference room object 30 to the corresponding conference program by the conference server 10; an additional registration step (step S22) of registering corresponding another computer 20 as a participant of a corresponding conference room object 30 by the conference server 10 if the conference room object 30 is selected by the conference program of the another computer 20; and a conference progress step (step S30) of transmitting video information transmitted by the conference program of the computer 20 to the conference program of another computer 20 by the conference server 10.

In addition, at the connection step (step S11), as the conference program of the computer 20 is connected to a webpage 11 implementing the conference room object 30 and connected to the conference server 10, information on the conference room object 30 is transmitted to the conference program of the computer 20, and at the additional connection step (step S21), as the conference program of the another computer 20 is also connected to the webpage 11 implementing the conference room object 30 and connected to the conference server 10, information on the conference room object 30 is transmitted to the conference program of the another computer 20.

In addition, this is a method in which name-type information is included in the information on the conference room object 30, and the name-type information included in the information on the conference room object 30 is outputted by the conference program of the computer 20 at the connection step (step S11), and a method in which state-type information is included in the information on the conference room object 30, and the state-type information included in the information on the conference room object 30 is outputted by the conference program of the computer 20 at the connection step (step S11).

DETAILED DESCRIPTION

The detailed configuration and process of the present invention will be described below with reference to the accompanying drawings.

Figure 1:
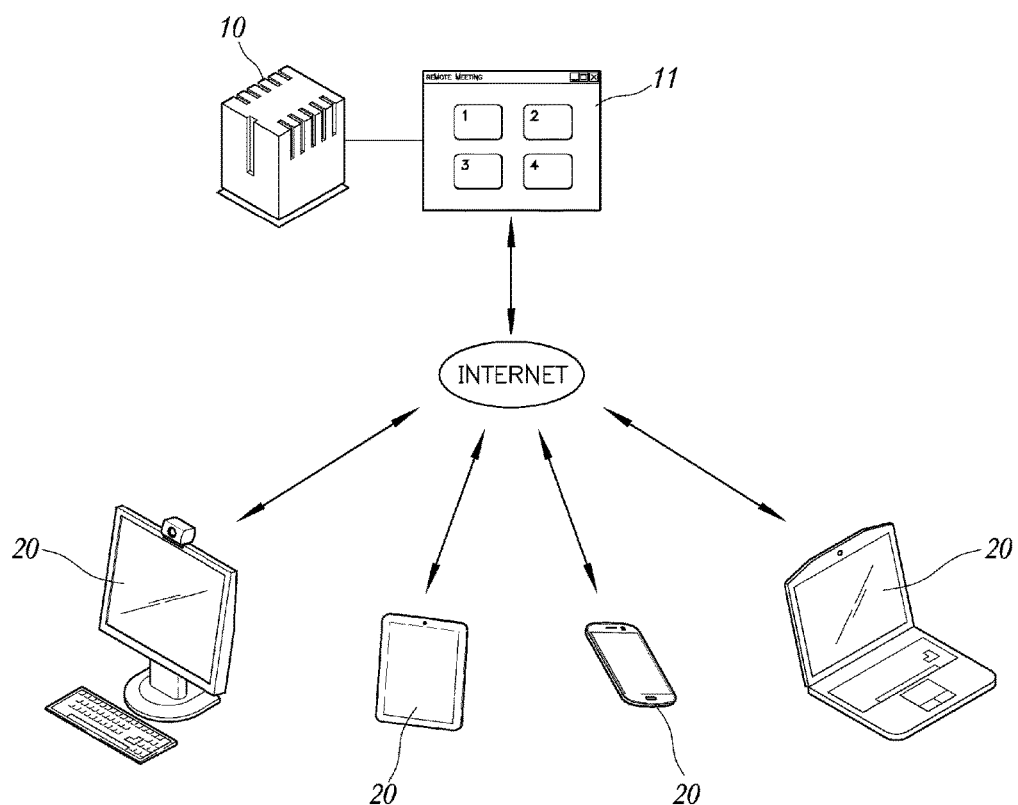
FIG. 1 is a view showing the configuration of the system of the present invention.

First, FIG. 1 is a view showing the components performing the present invention and a connection state among the components, and as shown in the figure, the present invention is performed by a plurality of computers 20 connected to the Internet and mounted with a photographing function and a conference server 10 connected to the plurality of computers 20 through the Internet to relay video information among the computers 20.

In addition, as shown in FIG. 1, the connection between a computer 20 and the conference server 10 is accomplished by connecting the computer 20 to a webpage 11 operated by the conference server 10 through the Internet, and since a general user authentication process can be applied to acceptance of the connection of the computer 20 by the conference server 10 in connecting the computer 20 and the conference server 10 through the webpage 11 or the like as described above, claims related to the connection are not specifically limited.

Various information devices such as a tablet computer 20, a smartphone and the like mounted with a photographing function and capable of connecting to the Internet as shown in FIG. 1, as well as a general desktop computer 20 or a laptop computer 20 mounted with a camera, can be applied as the computer 20 performing the present invention.

Figure 2:
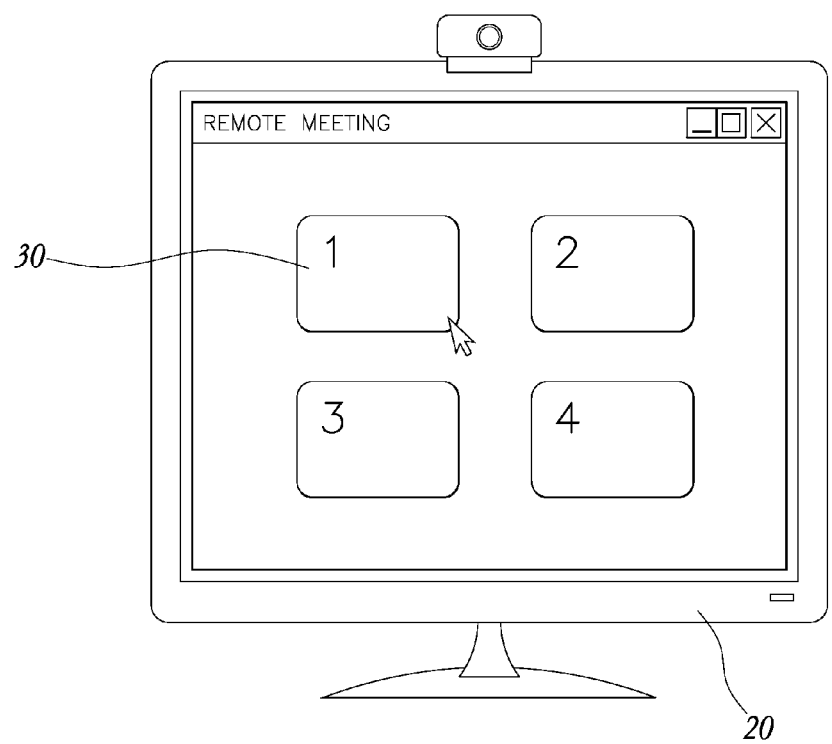
FIG. 2 is an exemplary view showing a computer screen of the present invention.

FIG. 2 is a view showing an example of the screen of a video conference participant computer 20 in the process of performing the present invention, and a plurality of conference room objects corresponding to a conference presently in progress or scheduled to be held is implemented on the screen of the computer 20, and it shows an example of a corresponding webpage 11 outputted by a computer 20 when the computer 20 connects to the server through the webpage 11, and if connection of the computer 20 as a qualified participant of the video conference is accepted by the conference server 10, the conference server 20 implements the webpage 11 including the plurality of conference room objects 30 as shown in the figure and transmits the webpage 11 to the computer 20.

This is equally applied to the computers 20 having equal qualification for participation, and here, the computers 20 having equal qualification for participation are computers 20 that can participate in a video conference displayed as a conference room object 30. When a group such as a company or the like joins as a user of the video conference service to which the present invention is applied, the computers 20 having equal qualification for participation correspond to computers 20 used by the members of the group.

That is, the video conference service through the Internet can be provided by a communication company, an Internet information provider, a video conference service provider or the like, and a group such as a company or the like may join as a user of the video conference service, and if an individual user, who is a member of the group such as a company or the like, connects to the conference server 10 through the Internet using his or her own computer 20, a conference room object 30 assigned to the group to which the user belongs is transmitted to the user computer 20.

At this point, the group to which the user of the computer 20 connected to the conference server 10 belongs can be specified by the conference server 10, and this can be performed without a problem in the user authentication process performed when connection of the computer 20 is accepted by the conference server 10 described above.

That is, through a general process of inputting authentication information, such as identification ID, a connection password and the like, of a user of a video conference service to which the present invention is applied, the input process being performed when the user connects to the conference server 10, the conference server 10 may confirm a group to which the user belongs as a member, and the conference server 10 transmits conference room objects 30 assigned to the group to which the user belongs in the form of a webpage 11 or the like, and thus a screen of equal contents is outputted on the computers 20 of the members belonging to the same group.

A plurality of conference room objects 30 is displayed on the screen as shown in FIG. 2, and the conference room objects 30 represent conferences that are in progress, scheduled to be held, or can be held, which is visually implementing a kind of virtual conference rooms on the screen of the computer 20, and a video conference participant participates in a corresponding conference by selecting a conference room object 30 implemented on the screen of his or her own computer 20 by clicking or touching the conference room object 30.

As described above, a user should input complicated identification information or a URL to participate in a video conference in a conventional technique, whereas a user may participate in a video conference only by intuitive handling of selecting a conference room object 30 implemented on the screen of the computer 20 by clicking or touching the conference room object 30, and since this is progressed in a method extremely similar to entering a conference room in a real conference, a general user does not need to fully understand the complicated setting and information input process to hold a video conference, and even a user who is inexperienced in using a computer 200 and the Internet may participate in the video conference extremely easily.

Particularly, since a screen displaying the same conference room objects 30 is outputted on the computers 20 of users having equal qualification for participation, i.e., the users belonging to a specific group, such as employees of the same company, a video conference may be held only by specifying a conference room object 30 and informing participants of the conference room object 30, e.g., by propagating only the room number of the conference room object 30 to all the participants in the embodiment shown in FIG. 2.

Figure 3:
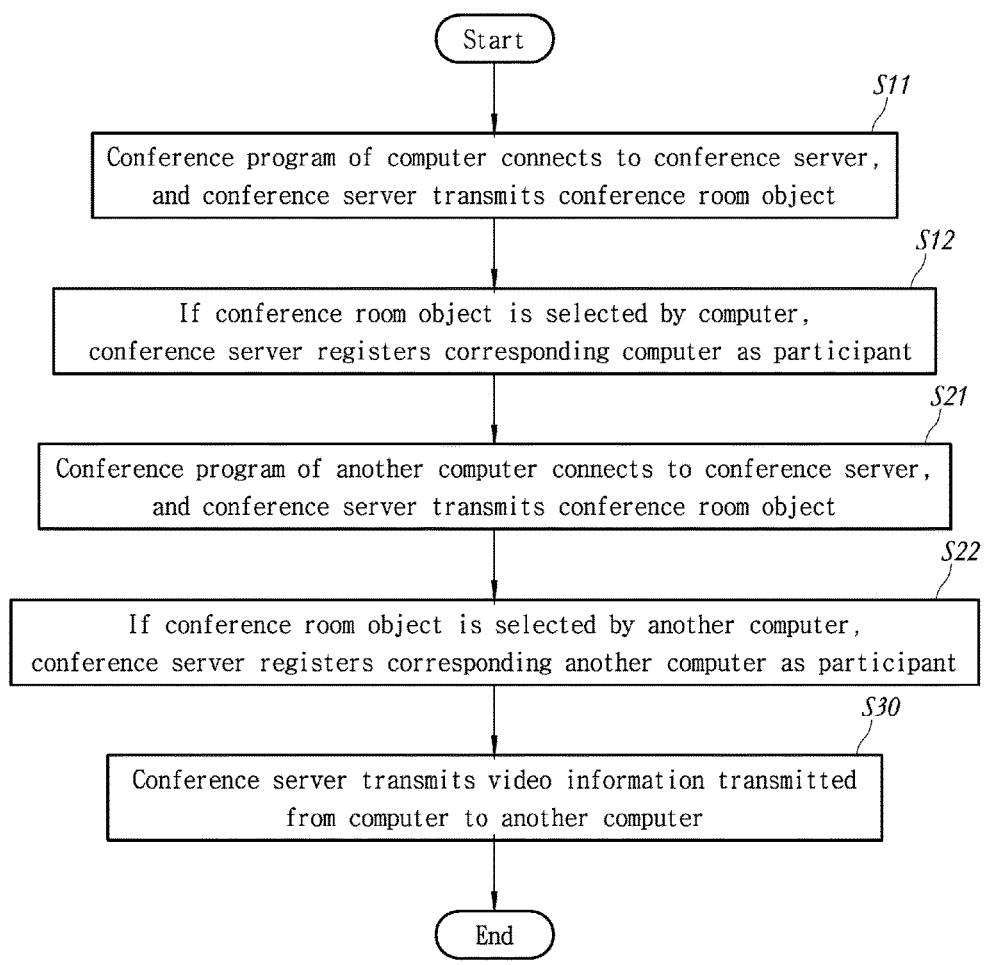
FIG. 3 shows the flowchart of the present invention.

Accordingly, through the present invention, information that should be shared by all conference participants when a video conference is held can be extremely simplified, and it is extremely easy to hold and participate in the video conference. Such a video conference method of the present invention begins with a connection step (step S11) of connecting to the conference server 10 through the Internet by a conference program of a computer 20 and transmitting information on conference room objects 30 to the conference program by the conference server 10 as shown in FIG. 3 illustrating a specific process of performing the video conference.

Here, the computer 20 is a computer 20 used by a member of a group such as a company or the like, which is a subscriber of the Internet video conference service of the present invention, and information devices such as a desktop computer 20, a laptop computer 20, a tablet computer 20, a smartphone and the like mounted with a photographing function and capable of connecting to the Internet can be applied as described above.

A conference program for communicating with the conference server 10, transmitting photographed video information and receiving video information transmitted from the conference server 10, receiving information on the conference room objects 30 transmitted from the conference server 10 and outputting the conference room objects 30 on the screen of the computer 20 is installed and executed in the computer 20 as a client program connected to the conference server 10 through the Internet in performing the present invention, and a specific form of the conference program may be a browser provided with a function of transmitting and receiving video information therein, a browser installed with a plug-in for transmitting and receiving video information, or a separate application program dedicated to connection to the conference server 10 and transmission and reception of video information.

Particularly, as shown in FIG. 1, a method of constructing a webpage 11 connected to the conference server 10 and connecting a conference program of the computer 20 to the conference server 10 using the webpage 11 as a medium can be applied in the present invention. In this case, at the connection step (step S11), as the conference program of the computer 20 is connected to the webpage 11 implementing the conference room objects 30 and connected to the conference server 10, information on the conference room objects 30 is transmitted to the conference program of the computer 20. Here, the browsers described above can be applied as the conference program, and since the browsers are programs familiar to general Internet users, if the browsers are applied as the conference program, it is advantageous in securing user's convenience.

At the connection step (step S11), the conference room objects 30 outputted on the screen of the computer 20 are objects that can be selected by click or touch handling of a user, such as an icon, a button or the like, and behave as a kind of hyperlink in using the present invention.

After the connection step (step S11) is completed, if a conference room object 30 is selected by the conference program of the computer 20, a registration step (step S12) of registering a corresponding computer 20 as a participant of a corresponding conference room object 30 is performed by the conference server 10. Therefore, a session for circulating video information photographed by the computer 20 is established between the computer 20 and the server, and the conference server 10 waits for participation of another participant in the video conference.

Meanwhile, if the registration step (step S12) is completed, an additional connection step (step S21) of connecting to the conference server 10 through the internet by the conference program of another computer 20 and transmitting information on the conference room objects 30 to the corresponding conference program by the conference server 10 is performed. Here, the another computer 20 is a computer 20 different from the computer 20 performing the connection step (step S11) and the registration step (step S12), i.e., a computer 20 of another participant of the video conference, and one another computer 20 can be set in the case of a video conference between two parties, and a plurality of another computers 20 can be set in the case of a video conference among multiple parties of three or more.

In addition, a program the same as the conference program of the computer 20 performing the connection step (step S11) and the registration step (step S12) described above is also applied as a conference program installed in the another computer 20, and as the conference program of the another computer 20 is also connected to the webpage 11 implementing the conference room objects 30 and connected to the conference server 10 at the additional connection step (step S21), like at the connection step (step S11) of applying the webpage 11 described above, information on the conference room objects 30 can be transmitted to the conference program of the another computer 20.

After the additional connection step (step S21) is completed, if a conference room object 30 is selected by the conference program of the another computer 20, an additional registration step (step S22) of registering a corresponding another computer 20 as a participant of a corresponding conference room object 30 is performed by the conference server 10. Therefore, a session for circulating video information photographed by the another computer 20 is established between the another computer 20 and the server, and in the case of a video conference among multiple parties of three or more, the conference server 10 waits for participation of still another participant in the video conference.

Figure 4:
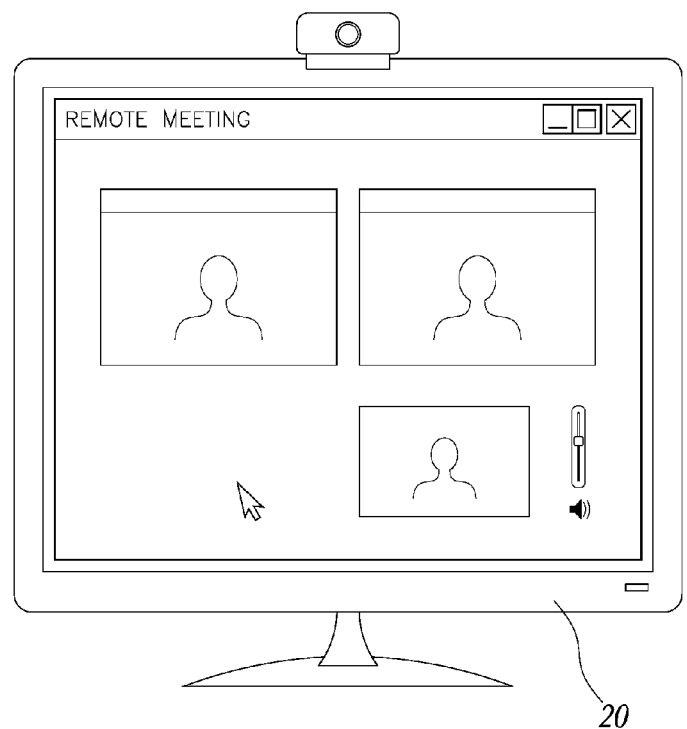
FIG. 4 is an exemplary view of a computer screen showing a state of progressing a video conference of the present invention.

Like this, as the connection step (step S11) to the additional registration step (step S22) are completed, a session for circulating video information is constructed between the computer 20 and the conference server 10 and between the another computer 20 and the conference server 10, and a conference progress step (step S30) is performed to transmit video information transmitted by the conference program of the computer 20 to the conference program of the another computer 20 by the conference server 10 and to transmit the video information transmitted by the conference program of the another computer 20 to the computer 20 by the conference server 10, and as shown in FIG. 4, a user participating in a video conference may progress the video conference while confirming photographed videos.

In the present invention, since a video conference is held through a process similar to actually entering a conference room through intuitive handling of a user such as clicking or touching a conference room object 30 implemented on the screen of the computer 20 as shown in FIGS. 2 and 3, even a user who is inexperienced in using a computer 200 and the Internet may conveniently use the video conference service without separately understanding how to use.

Particularly, the conventional technique is inconvenient in that complicated identification information, the uniform resource locator (URL) of the server program or the like should be necessarily shared among all the conference participants to hold the video conference, and a process of transmitting and receiving the identification information or the URL by the video conference participants through an email or a messenger should be preceded to this end. However, in the present invention, if the video conference participants share simple information that can specify a conference room object 30, e.g., share only a corresponding numeral in the case of a conference room object 30 marked with a numeral as shown in FIG. 2, the video conference can be proceeded immediately, and this is also recognized by a user as a process extremely similar to the progress of a real conference.

That is, assuming a process of proceeding a real conference in a general company, as a conference participant who initially proposes to hold the conference reserves or occupies a conference room and notifies other participants of the room number of the conference room, all the conference participants enter the conference room, and the conference is proceeded. In the present invention as described above, since conference participants recognize a conference room object 30 implemented on the screen of a computer 20 as a conference room of a real conference and recognizes a numeral or the like marked on the conference room object 30 as the room number of a corresponding conference room as shown in FIG. 2, although it is a video conference performed among remote participants through the Internet, they feel the progress of a method the same as that of a real conference.

Meanwhile, as described above, the conference room object 30 of the present invention is an object such as an icon, a button or the like behaving as a hyperlink, and although a simple numeral may be marked on the conference room object 30 as shown in FIG. 2, a character string, an image or the like may be marked other than the numeral, and the character string or the image is information on the conference room object 30 and provided to each computer 20 by the conference server 10.

Figure 5:
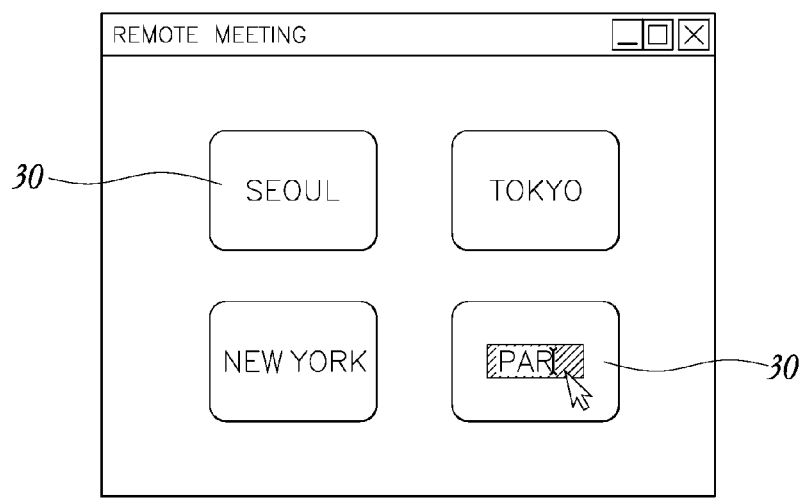
FIG. 5 is an exemplary view showing a computer screen according to an embodiment of the present invention applying name-type information.

Particularly, name-type information of a character string form may be included as shown in FIG. 5 as information on the conference room object 30, and in this case, the name-type information included in the information on the conference room object 30 is outputted by the conference program of the computer 20 at the connection step (step S11), and the name-type information included in the information on the conference room object 30 is outputted by the conference program of another computer 20 at the additional connection step (step S21).

That is, since a city name or the like, not a simple numeral, may be applied as information for specifying a conference room object 30 as shown in FIG. 5 by setting the name-type information as the information on the conference room object 30, correctness of communication is secured in sharing the information for specifying a conference room object 30 among video conference participants, and confusion about the conference room objects 30 that may occur when a video conference is held can be prevented.

In other words, it is more effective to assign a name to each conference room and notify the name of a corresponding conference room, rather than simply notifying conference participants of the room number of the conference room, in holding a real conference, and the conference participants may feel the progress of a method the same as that of a real conference through the naming of conference rooms.

Although the name-type information of a conference room object 30 may be one-sidedly and fixedly assigned by the conference server 10, it may be set to be changed by the user as shown in the lower right portion of FIG. 5.

Figure 6:
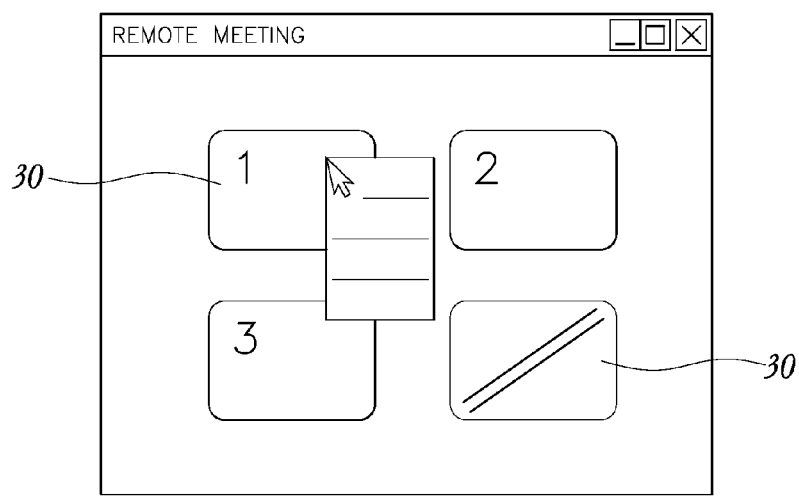
FIG. 6 is an exemplary view showing a computer screen according to an embodiment of the present invention applying state-type information.

Meanwhile, in the present invention, user's convenience can be maximized by adopting state-type information as information on a conference room object 30, other than the name-type information, and an embodiment thereof is shown in FIG. 6.

Here, the state-type information is information including a list of participants and an agenda of a video conference or whether or not to participate in the video conference that is progressed using a conference room object 30 as a medium, and as described above, since the conference room object 30 of the present invention is an object implemented on the screen of a computer 20, the state-type information may be set as an attribute or a specification of a corresponding object, and a user may confirm the state-type information such as a list of participants or the like of the video conference from a corresponding conference room object 30 through handling such as clicking the right button of a mouse after positioning the cursor on the conference room object 30.

That is, the state-type information included in the information on the conference room object 30 is outputted by the conference program of the computer 20 at the connection step (step S11) described above, and output of the state-type information on the conference room object 30 can be accomplished in a method of displaying a list of participants as shown in the upper left portion of FIG. 6 and displaying whether or not to participate in the conference as shown in the lower right portion of the same figure.

The conference room object 30 shown in the lower right portion of FIG. 6 expresses that the corresponding conference is in a state unable to participate in any more, and as a participant of the video conference changes the state-type information of the conference room object 30, the appearance of the conference room object 30 is changed, and at the same time, joining of additional participants is rejected, and this can be effectively used when it needs to keep secret details of the conference.

Through the present invention, it is possible to participate in a video conference only by intuitive handling of selecting an object implemented in a computer 20 without inputting the complicated identification information or a URL, and therefore, an effect of enhancing user's convenience and expanding utilization of the Internet video conference can be obtained.

Particularly, since even a user who is inexperienced in using a computer 20 and the Internet may easily use a video conference service and information that should be shared by all conference participants to hold a video conference can be extremely simplified, confusions and errors generated in the process of holding the video conference can be fundamentally prevented.

What is claimed is:

1. A video conference method using a conference room object, the method being performed by a plurality of computers and a conference server connected through the Internet, and comprising: a connection step (step S11) of connecting to the conference server through the Internet by a conference program of a computer and transmitting information on the conference room object to the corresponding conference program by the conference server; a registration step (step S12) of registering a corresponding computer as a participant of a corresponding conference room object by the conference server if the conference room object is selected by the conference program of the computer; an additional connection step (step S21) of connecting to the conference server through the Internet by a conference program of another computer and transmitting information on the conference room object to the corresponding conference program by the conference server; an additional registration step (step S22) of registering corresponding another computer as a participant of a corresponding conference room object by the conference server if the conference room object is selected by the conference program of the another computer; and a conference progress step (step S30) of transmitting video information transmitted by the conference program of the computer to the conference program of another computer by the conference server, wherein at the connection step (step S11), as the conference program of the computer is connected to a webpage implementing the conference room object and connected to the conference server, information on the conference room object is transmitted to the conference program of the computer, and at the additional connection step (step S21), as the conference program of the another computer is also connected to the webpage implementing the conference room object and connected to the conference server, information on the conference room object is transmitted to the conference program of the another computer.

2. The method according to claim 1, wherein name-type information is included in the information on the conference room object, and the name-type information included in the information on the conference room object is outputted by the conference program of the computer at the connection step (step S11).

3. The method according to claim 1, wherein state-type information is included in the information on the conference room object, and the state-type information included in the information on the conference room object is outputted by the conference program of the computer at the connection step (step S11).

* * * * *